(12) United States Patent
Dorum et al.

(10) Patent No.: US 7,084,882 B1
(45) Date of Patent: Aug. 1, 2006

(54) METHOD TO PROVIDE SMOOTHNESS FOR ROAD GEOMETRY DATA AT INTERSECTIONS

(75) Inventors: Ole Henry Dorum, Chicago, IL (US); Roy Casino, Mundelein, IL (US); Mohan Kola, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 31 days.

(21) Appl. No.: 10/819,029

(22) Filed: Apr. 6, 2004

Related U.S. Application Data

(63) Continuation-in-part of application No. 09/729,939, filed on Dec. 5, 2000.

(51) Int. Cl.
*G09G 5/02* (2006.01)

(52) U.S. Cl. ............ 345/589; 345/590; 345/592; 345/611; 345/629

(58) Field of Classification Search ........ 345/441–443, 345/419, 629, 589, 590, 592, 611; 340/988; 701/208
See application file for complete search history.

(56) References Cited

U.S. PATENT DOCUMENTS

| | | | |
|---|---|---|---|
| 5,438,517 A | 8/1995 | Sennott et al. | 364/449 |
| 5,470,233 A | 11/1995 | Fruchterman et al. | 434/112 |
| 5,497,451 A | 3/1996 | Holmes | 395/120 |
| 5,566,288 A | 10/1996 | Koerhsen | 395/142 |
| 5,771,310 A | 6/1998 | Vannah | 382/154 |
| 5,902,350 A | 5/1999 | Tamai et al. | 701/211 |
| 5,910,177 A | 6/1999 | Zuber | 701/202 |
| 6,029,173 A | 2/2000 | Meek et al. | 707/102 |
| 6,138,084 A | 10/2000 | Mine | 702/157 |
| 6,188,957 B1 | 2/2001 | Bechtolsheim et al. | 701/209 |
| 6,253,164 B1 | 6/2001 | Rohm et al. | 703/2 |
| 6,256,038 B1 | 7/2001 | Krishnamurthy | 345/419 |
| 6,292,752 B1 | 9/2001 | Franke et al. | 701/300 |
| 6,345,235 B1 | 2/2002 | Edgecombe et al. | 703/27 |
| 6,424,911 B1 * | 7/2002 | Yamashita et al. | 701/208 |
| 6,505,117 B1 | 1/2003 | Ratert et al. | 701/209 |
| 6,510,382 B1 | 1/2003 | Wilson | 701/208 |
| 6,624,782 B1 | 9/2003 | Jocoy et al. | 342/70 |

(Continued)

FOREIGN PATENT DOCUMENTS

EP 0 394517 B1 6/1993

(Continued)

OTHER PUBLICATIONS

Web pages, NEC Research Index (http://citeseer.nj.nec.com) paper entitled "Mining GPS Data to Augment Road Models", (1999) Rogers et al., 21 pages.

(Continued)

*Primary Examiner*—Kee M. Tung
*Assistant Examiner*—Mike Rahmjoo
(74) *Attorney, Agent, or Firm*—Grace Law O'Brien; Frank J. Kozak; Jon D. Shutter

(57) ABSTRACT

A method for representing shapes of road segments is disclosed. The shape of a portion of road that spans at least one intersection is represented using a single continuous non-uniform B-spline. The single continuous non-uniform B-spline is divided into separate sections by knot insertion at each position corresponding to the location of a spanned intersection. The separate sections of the single continuous non-uniform B-spline are each re-parameterized into multiple separate continuous non-uniform B-splines. Then, data indicating each of the separate non-uniform B-splines is used to represent each of the corresponding road segments in the portion of road.

34 Claims, 5 Drawing Sheets

U.S. PATENT DOCUMENTS

| | | | |
|---|---|---|---|
| 6,628,278 B1 * | 9/2003 | Ritter | 345/419 |
| 6,639,592 B1 * | 10/2003 | Dayanand et al. | 345/419 |
| 6,681,177 B1 | 1/2004 | Joshi | 701/208 |
| 6,728,392 B1 | 4/2004 | Joshi | 382/104 |
| 2001/0056326 A1 | 12/2001 | Kimura | 701/208 |
| 2002/0013659 A1 | 1/2002 | Kusama | 701/211 |
| 2003/0187578 A1 | 10/2003 | Nishira et al. | 701/301 |

FOREIGN PATENT DOCUMENTS

| | | |
|---|---|---|
| EP | 0 807 803 A2 | 11/1997 |
| EP | 0919788 A1 | 6/1999 |
| EP | 1096229 | 5/2001 |
| JP | 409147127 A * | 6/1997 |
| WO | WO 95/32483 | 11/1995 |

OTHER PUBLICATIONS

Painter et al., U.S. Appl. No. 09/918,668, filed Jul. 31, 2002, entitled: Method for Representing Roads in a Geographic Database.

* cited by examiner

METHOD TO PROVIDE SMOOTHNESS FOR ROAD GEOMETRY DATA AT INTERSECTIONS

REFERENCE TO RELATED APPLICATION

The present application is a continuation-in-part of Ser. No. 09/729,939, filed Dec. 5, 2000, the entire disclosure of which is incorporated by reference herein.

FIELD OF INVENTION

The present invention relates generally to cartographic databases, and more particularly, to the representation of geographic features using polynomial splines.

BACKGROUND OF THE INVENTION

Computer-based navigation systems for use on land have become available in a variety of forms and provide a variety of useful features. These types of navigation systems can be used to display maps, provide route guidance, or to help a user find locations of specific restaurants, hotels, airports, and shopping centers, for example.

These navigation systems use data that represent the geographic features located in a region. The geographic features that are represented include the road network located in the region, intersections, points of interest (such as hotels, gas stations, ATMs, government buildings, etc.), lakes, golf courses, and so on.

In some geographic databases, each road is represented as one or more discrete road segments, each of which is represented by a separate data entity. A representation of a road segment includes, among other things, information about its location (i.e., latitude, longitude, and possibly altitude) and shape. If a road segment is straight, it can be represented by identifying its endpoints. However, if a road is other-than-straight, additional information is required to indicate the shape of the road.

One way to represent the shape of an other-than-straight linearly extending feature, such as a road segment, is to use shape points. Shape points are points through which a road segment passes between its end points. By providing the coordinates of one or more shape points, the shape of an other-than-straight road segment can be represented.

There are other ways of representing other-than-straight linearly extending features. For example, linearly extending features may be represented using mathematical expressions, such as splines. Use of mathematical expressions, such as splines, may provide for a smooth and possibly more realistic way to represent linearly extending geographic features.

Although use of mathematical expressions, such as splines, provides advantages, there is still room for improvement. One consideration associated with the use of splines, or other mathematical expressions for representing linearly extending geographic features, relates to the representation of intersections. Where two road segments, each represented by separate splines, connect to each other end to end, the spline that represents one of the road segments may not necessarily align with the spline that represents another road segment. In other words, there may not necessarily be a smooth transition between the splines that represent road segments that connect to each other end to end. This may occur even if the actual road segments in the real world connect to each other with a smooth transition.

Accordingly, it is an objective to represent geographic features, such as road geometry, in a way that provides smooth curve geometry at intersections.

SUMMARY

According to an exemplary embodiment, a computer-readable medium that has computer readable data stored thereon for representing geographic features in a geographic region is provided. The computer readable data includes a polynomial spline representation of a geographic feature. Points of the polynomial spline representation that correspond to road intersection points are associated with a parametric value in order to divide the polynomial spline representation into segments based on the road intersection points.

In another respect, the exemplary embodiment may take the form of a method for storing computer readable data for representing geographic features in a geographic region. The computer readable data includes a polynomial spline representation of a geographic feature. The method includes identifying points of the polynomial spline representation that correspond to road intersection points, and associating a knot value with each road intersection point. The method further includes storing data entities in the geographic database to represent the polynomial spline representation. In this respect, the data entities include the knot values associated with the road intersection points.

In still another respect, the exemplary embodiment may take the form of a method of producing a geographic database. The method includes forming a polynomial spline that represents a geographic feature in a geographic region in which the polynomial spline is associated with a set of knot values. The method also includes determining points of the polynomial spline that correspond to road intersection points. The method further includes subdividing the polynomial spline, by performing knot-insertions at the intersection points, into individual reparameterized splines that maintains the shape of the original spline and storing data entities representing the control points and knots of the new splines in the geographic database.

Any of the methods of the exemplary embodiment may be stored in the form of computer-readable data on a computer readable medium. A processing unit may then access the computer readable medium, execute the computer-readable data, and perform the methods.

These as well as other features, advantages and alternatives will become apparent to those of ordinary skill in the art by reading the following detailed description, with appropriate reference to the accompanying drawings.

DETAILED DESCRIPTION OF EXEMPLARY EMBODIMENTS

I. Representing Geographic Features in Cartographic Databases

In an exemplary embodiment, a method for representing geographic features in cartographic databases is provided. Data entities including shape points and nodes can be used to represent geographic features within a geographic region. In one embodiment, shape points and nodes comprise coordinate triples (longitude, latitude, altitude) or coordinate pairs (longitude, latitude), which represent specific locations along geographic features. (Coordinate triples and coordinate pairs are only two possible ways of representing these locations and other ways for representing locations may be used.) Nodes are special cases of shape points, representing, for example, intersections between road segments and end points of geographic features. The shape points can be included in a cartographic database used for map display. The cartographic database itself may be part of a larger geographic database, which may include other kinds of databases used for functions such as route calculation, maneuver generation, and other navigational functions.

Data stored in a shape point database can be organized on a per geographic feature basis, i.e., each geographic feature is represented as a sequence of nodes and shape points. A pair of nodes and zero or more shape point entries can be associated with each geographic data entity. For entities representing straight or substantially straight geographic features, the nodes are sufficient to accurately represent the feature; and therefore, for straight geographic features, the nodes alone can be stored without shape points.

Generally, for each geographic feature data entity in the shape point database, a processor can generate a corresponding set of control points and other parameters that define a "spline." These control points and other parameters can be used to compute a spline function, which can be used to represent the geographic feature in a displayable map.

A polynomial spline refers to any composite curve formed with piecewise polynomial functions representing curve sections and satisfying specified conditions at boundaries of the sections. Thus, there are many types of spline curves. For example, the polynomial spline can be any type of spline, for example, a uniform or nonuniform nonrational B-spline, Non-Uniform Rational B-Spline (NURBS), or a uniform or nonuniform Catmull-Rom spline.

With spline curves, other-than-straight map features, such as curving road portions, are represented by polynomial equations whose coefficients have been determined so as to generate curves that match the shapes of the geographic features with the desired degree of accuracy. Thus, splines are a means of describing the shape of a series of points by specifying the coefficients of a polynomial equation.

Figure 1:
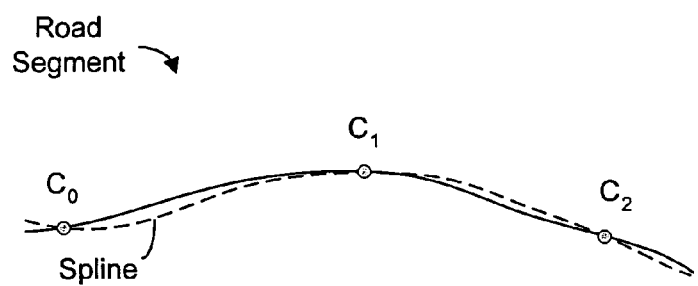
FIG. 1 depicts one embodiment of a geographic feature represented by a polynomial spline.

Referring now to the drawings, and in particular to FIG. 1, a polynomial spline representation of a geographic feature is illustrated. The spline is shown as a dashed line, while actual geometry of the geographic feature is shown as a solid line.

A polynomial spline consists of piecewise polynomial functions which are joined end to end with some continuity condition imposed at the join points. The polynomial spline of FIG. 1 is determined by a set of control points $C_0$, $C_1$, ... $C_N$, and possibly, additional parameters (e.g., knots and/or control point weights). A control point is a physical point that lies on or close to an actual point along the represented geographic feature. A set of control points mathematically describes the spline. Thus, the control points dictate the shape of a spline. As shown in FIG. 1, the control points $C_0$, $C_1$, ... $C_2$ define a shape very similar to the actual geographic feature. Similar to a shape point, the control point can be a coordinate triple (longitude, latitude, altitude) or coordinate pair (longitude, latitude), which represent specific locations along geographic features.

Generally, the number of control points per segment of a spline is set to be less than the number of shape points per segment. This results in smaller database storage requirements. The number of control points per segment can be set to a predetermined value or fraction of the number of shape points, or alternatively, the number can be selected by a user or be dynamically computed on a per segment basis depending on the desired level of representational accuracy.

A geographic feature that has a straight section and an other-than-straight section can be represented by shape points and polynomial spline control points. For example, for geographic features that have long straight sections, the straight sections can be represented using conventional linear interpolation and curved sections can be represented by splines. The shape point coordinates of the endpoints of the straight section, the control points corresponding to the curved sections and other defining parameters can be stored in a single geographic feature data entity. The points at which individual polynomial curve segments of a polynomial spline curve join together are referred to as "knots." The segments are joined in such a way as to provide smoothness of the complete curve. A knot vector is an ordered list of non-decreasing floating point numbers that describe points along the spline curve where segments begin and end.

Figure 2:
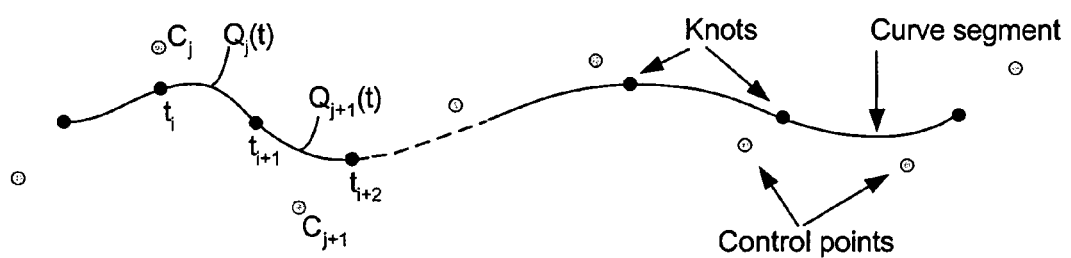
FIG. 2 depicts another embodiment of a geographic feature represented by a polynomial spline.

At each interior knot, the polynomial segments on each side are constrained to have the same value of the spline function and some of its derivatives. The spline curve has a polynomial degree p (as defined by the degree of the spline function) with up to p−1 continuous derivatives at the knots of the curve. An example of a spline curve composed of cubic polynomial pieces joined so that the curve and its first and second partial derivatives are all continuous is shown in FIG. 2. The interior knots $t_i$, $t_i \leq t_{i+1}$, determine the intermediate parametric points on the spline where the spline segments $Q_j(t)$ meet. In general, to provide that $p^{th}$ derivatives of the spline are continuous at the knots, a spline of degree (p+1) or greater is used.

When the knot spacing is uniform, the spline is referred to as being uniform, and conversely, when the knot spacing is non-uniform, the spline is termed as a non-uniform spline. Knot spacing may be determined based on the length of the segments of the spline. For example, a straight section of a geographic feature may be represented by long spline segments, and thus may have large knot spacing. In contrast, a sharp curve of a geographic feature will be represented by short spline segments through the turn, and thus will have small knot spacing. A knot vector is usually parameterized within the range of 0 to 1, and the magnitude of each knot spacing, $t_{i+1} - t_i$, determines the length of each spline segment.

A spline can be fit to the shape points and nodes representing each geographic feature by applying a least squares approximation or any other regression method (e.g., Least Trimmed Squares, Least Median of Squares, etc.) to the shape points and other parameters that define the geographic feature to generate the selected number of spline control points for each segment.

Present embodiments are not limited to any particular method of performing a least squares approximation or any other regression method, such as Least Trimmed Squares, Least Median of Squares, and so on. The least squares methodology should be used with any type of spline function, including uniform B-splines, non-uniform B-splines, or Catmull-Rom splines, for example.

II. Representation of Splines in a Geographic Database

Figure 3:
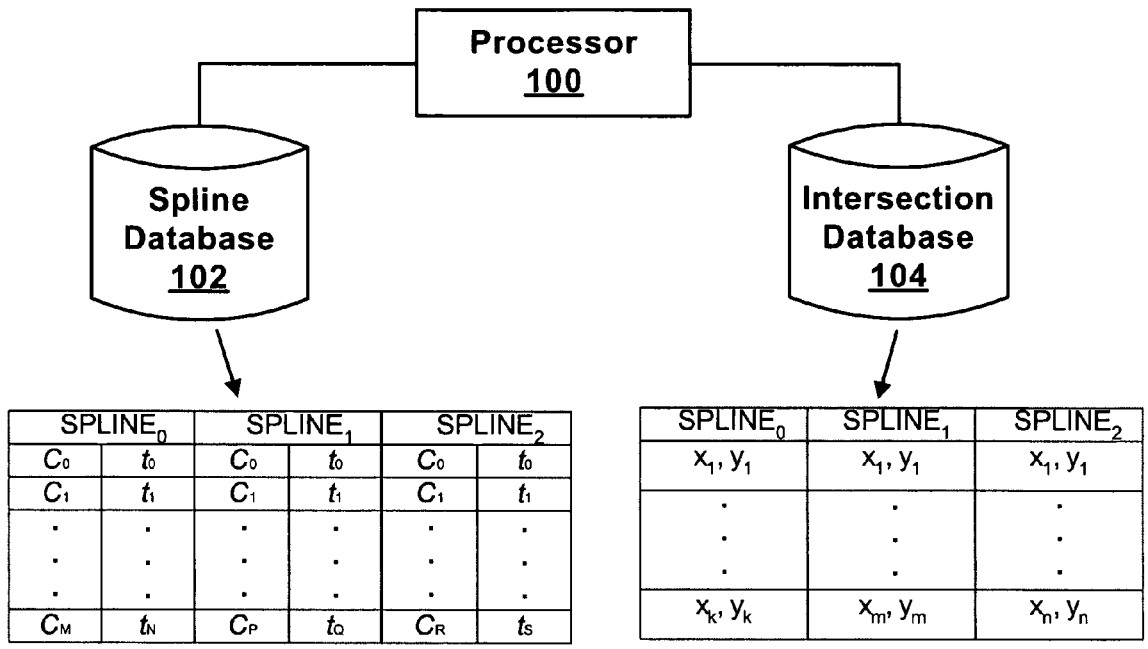
FIG. 3 illustrates one embodiment of a system for producing polynomial splines.

FIG. 3 illustrates one embodiment of a system for producing polynomial splines. The system of FIG. 3 represents a logical model and not necessarily an architectural model. The system includes a processor 100, a spline database 102, and an intersection database 104. The spline database 102 and the intersection database 104 may be stored on separate computer readable media or may be stored on the same computer readable medium. The processor 100 can be any computing device for performing the steps shown in the flow chart of FIG. 8 (discussed below), including a conventional personal computer (PC) executing a software program.

The spline database 102 includes data entities that correspond to polynomial splines, which represent geographic features in a geographic region. Thus, the spline database 102 includes a set of control points and a set of knot values for each. The control points and knot values may be included within a table format as illustrated. For example, a spline may be described by a set of control points and knot values. As shown, $SPLINE_0$ is described by control points $C_0$, $C_1, \ldots C_M$ and knot values $t_0, t_1, \ldots t_N$; $SPLINE_1$, is described by control points $C_0, C_1, \ldots C_P$ and knot values $t_0, t_1, \ldots t_Q$; and $SPLINE_2$ is described by control points $C_0$, $C_1, \ldots C_R$ and knot values $t_0, t_1, \ldots t_S$; The spline database 102 may also be arranged in other formats as well. In addition, a spline need not have the same number of control points and knot values. (The number of control points and knots for any given spline varies and depends on polynomial degree, number of segments and knot-multiplicity. Each spline segment belonging to a single spline should have the same number of control points, and is defined between pairs of knot values regardless of degree.)

Furthermore, the spline database 102 may also include values corresponding to lengths of the splines or spline segments. For example, lengths of the splines can be determined based upon the spacing between knot values. However, spline length information could also be computed based on the knot spacing instead of stored within the spline database 102. It should be understood that spline length information is optional, and the spline database 102 may include other types of information as well.

In the exemplary embodiment, the control points and knot values for respective splines and/or spline segments are arranged in an ordered sequence to simplify generation of the spline representation. For example, referring back to FIG. 2, the spline illustrated would be represented by a data entity that has control points stored in the order $C_0, C_1, \ldots C_M$ such that the spline would be generated accordingly. Similarly, referring back to FIG. 2, the spline illustrated would be represented by a data entity that has the knot values stored in the sequence $t_0, t_1, \ldots t_i, \ldots t_N$, where $t_i \leq t_{i+1}$ such that they describe the parametric locations for the beginning and end of each consecutive curve segment along the spline.

In another embodiment, the knot values for splines may be stored in any manner, and after the processor 100 reads the data, the processor 100 sorts the knot values in order to generate the spline. For example, the knot values can be sorted numerically since they form a non-decreasing sequence of floating point numbers to generate the spline.

The intersection database 104 includes information associated with road intersections, which are locations at which two roads meet at the same level. The intersection database may also include the segment IDs of each crossing road. The information is latitude and longitude coordinates of the intersection location. The information can also be parametric values or knot indices associated with the spline. Continuing with the example from the spline database 102, includes three splines, $SPLINE_0$, $SPLINE_1$, and $SPLINE_2$. The first spline, $SPLINE_0$, is shown to have an intersection with other roads at coordinates $(x_1, y_1), \ldots,$ and $(x_k, y_k)$. In addition, the second spline, $SPLINE_1$, is shown to have an intersection with other roads at coordinates $(x_1, y_1), \ldots,$ and $(x_m, y_m)$ and the third spline, $SPLINE_2$, is shown to have an intersection with other roads at coordinates $(x_1, y_1), \ldots,$ and $(x_n, y_n)$. The intersection database 104 can also include other information as well, such as names of the intersecting roads, information concerning intersection maneuvers, information concerning traffic signaling at the intersections, etc.

Figure 4:
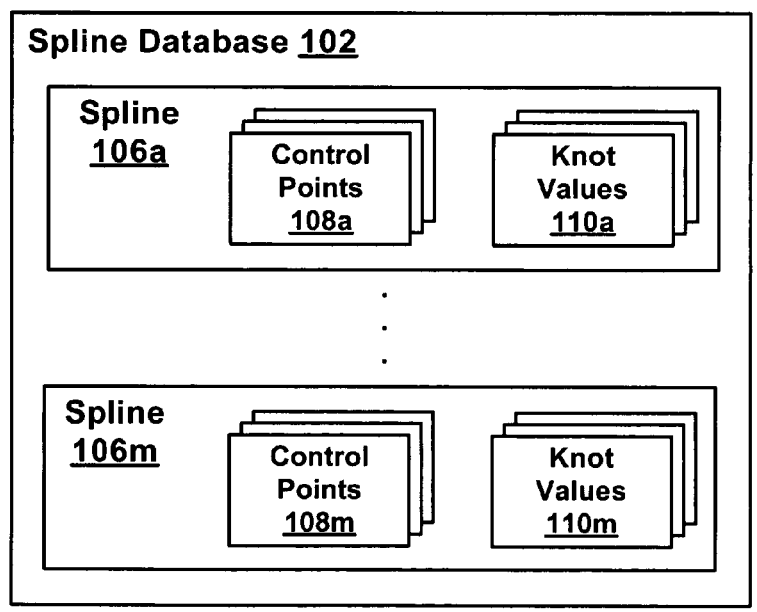
FIG. 4 is a diagram that shows components of one embodiment of a spline database.

FIG. 4 is a diagram that shows components of an embodiment of the spline database 102. The spline database 102 includes spline data entities 106a–m that represent respective splines. For example, the spline data entities 106a–m include control points 108a–m and knot values 110a–m so that the processor 100 can read the spline data entities 106a–m and render the corresponding splines on a display using this data.

IV. Method to Create Non-Uniform B-Splines Across Multiple Road Segments

In an exemplary embodiment, a single non-uniform B-spline is divided into multiple splines across multiple road segments to maintain geometry continuity at locations of the represented geographic feature that represent intersections. In particular, in one embodiment, locations of the polynomial spline representation that correspond to road intersection points are represented by knot values in order to divide the polynomial spline representation into multiple segments. Since the spline may be divided arbitrarily without altering the resulting curve shape, knot-insertion may be used to split the spline into individual splines, one for each road segment. The splines constituting each road segment between the inserted knots are then re-parameterized into individual non-uniform B-splines. Thus, a single continuous and smooth ("smooth" is defined in terms of curvature of the road across the boundaries between road segments) spline is fitted across multiple road segments.

Figure 5:
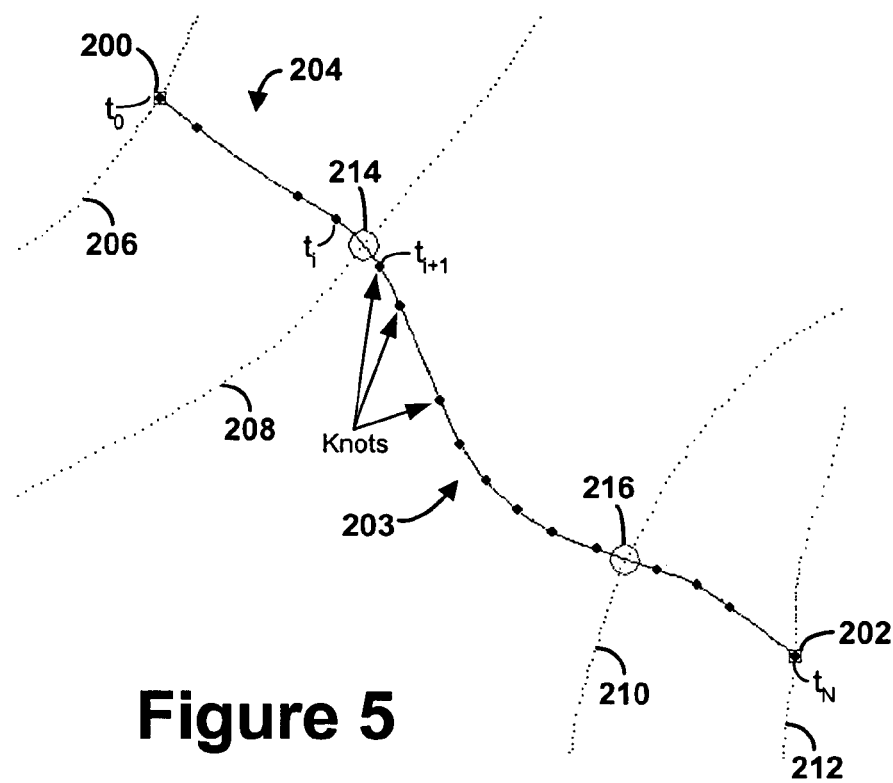
FIG. 5 illustrates one example of a spline that has been fitted across three road segments to provide continuity at road intersections.

FIG. 5 illustrates one example of a non-uniform cubic B-Spline 204 that has been fitted across three road segments that to provide continuity of the geometry at the intersections. Fitting a spline to each of the road segments individually does not necessarily provide that the splines are smooth at the boundaries where they meet at intersection (i.e. have the same position, tangent, and curvature) even when common intersection boundary constraints are used. The squares 200 and 202 indicate the end points of the spline, and the dots indicate the knots of the fitted spline. The knots denote the beginning and end of each curve segment. The knots are parameterized from $t_0$ to $t_N$, with to corresponding to endpoint 200 and $t_N$ corresponding to endpoint 202. (There are 16 knot values according to the figure, but the first knot and last knot are repeated k times, yielding 16+6 knots for cubic splines.) The road segments that spline 204 has been fitted to constitute the main road 203 in this geographic representation, and roads 206, 208, 210, and 212 (which are illustrated as dashed lines) are intersecting roads.

Points 214 and 216 on spline 204 are intersection points between main road 203 and the roads 208 and 210. It is desirable to subdivide the single spline that has been fitted across the three road segments such that it becomes three separate splines, one for each road segment, to provide the splines are smooth across the boundaries between segments. In the case of non-uniform B-Splines, such splines can be subdivided at any desired location by a process called "knot-insertion". Knot-insertion of a spline is a known technique. For more information on knot-insertion, the reader is referred to *The Nurbs Book*, $2^{nd}$ edition, by Les Piegl and Wayne Tiller, published by Springer-Verlag Berlin Heidelberg in 1995 and 1997, the contents of which are incorporated herein by reference. This technique provides that the splines resulting from the subdivision step have the exact same shape as the original spline. This provides the desired continuity at the boundary between the resulting splines after the split. Other curve or spline types may also be subdivided using similar or other techniques. In the exemplary embodiment, knots are inserted at the intersection points. Inserting a knot at an intersection creates a curve segment joint (knot) at the intersection location on the spline, and produces a new control point as well as modifies existing control points. Inserting the same knot value multiple times will split the spline at that location. The number of knot-insertions (knot-multiplicity) needed to split the spline at an arbitrary location depends on the polynomial degree p of the spline; in the case of a cubic (p=3), three knot insertions are needed.

Figure 6:
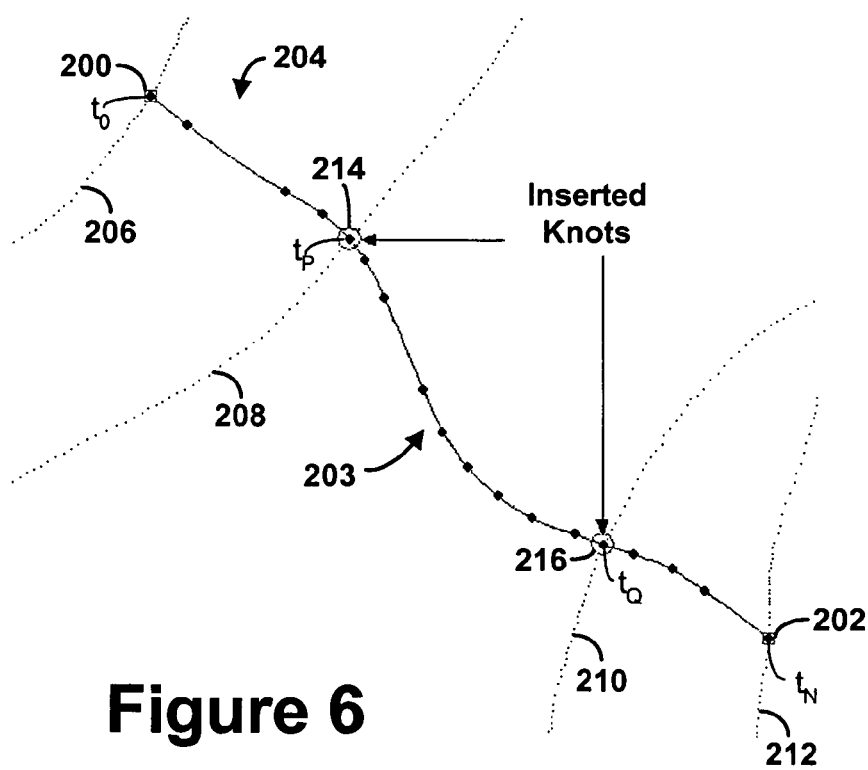
FIG. 6 illustrates one example of knot insertion at road intersection points.

As shown in FIG. 6, knots $t_P$ and $t_Q$ are inserted at the intersection points 214 and 216 respectively to subdivide the curve at the intersection locations. (Note that intersection points 200 and 202 are already associated with knot endpoints).

In general, the first and last control points of a spline are chosen to be intersection points, such that a spline traverses between two points that represent intersections. However, the spline does not have to traverse between two adjacent intersections. The length of a spline, and the number of road crossing points (e.g., intersections) of the spline depend upon many factors including application-specific desired use of this data and system designer preferences.

In the exemplary embodiment, the parametric values for the knots to be inserted are determined using a closest-point technique, which involves projecting a known intersection point onto the spline. For example, if intersection locations are known, as may be determined from the intersection database 104, an intersection point can be projected onto the spline to receive a parametric value on the spline for the intersection location. Knot-insertion can then be performed at this intersection using the closest-point parametric value on the spline for the intersection location as the knot value.

Using the closest point-technique, a data point from a cross-road that determines the intersection that is close to the spline is selected and projected onto the spline. If there are multiple points on the crossing road that are close to the spline, a few points near the intersection are selected and projected onto the spline. Subsequently, the cross-road data point that is closest to the spline can be selected as an estimation of the intersection point, and its closest-point parametric value on the spline is used for knot-insertion.

In another embodiment, intersection locations can be determined based on crossing points between splines. For example, crossing splines can be determined from the intersection database 104, or splines within the spline database can each be compared to one another to determine which, if any, splines cross based on the latitude and longitude coordinates of the spline. Upon determining that two splines cross, an estimated intersection point can be determined by estimating a point nearest the crossing point of the splines. The appropriate knot value for each spline can be determined as the parametric point on each spline having the closest distance to the determined intersection point.

Figure 7:
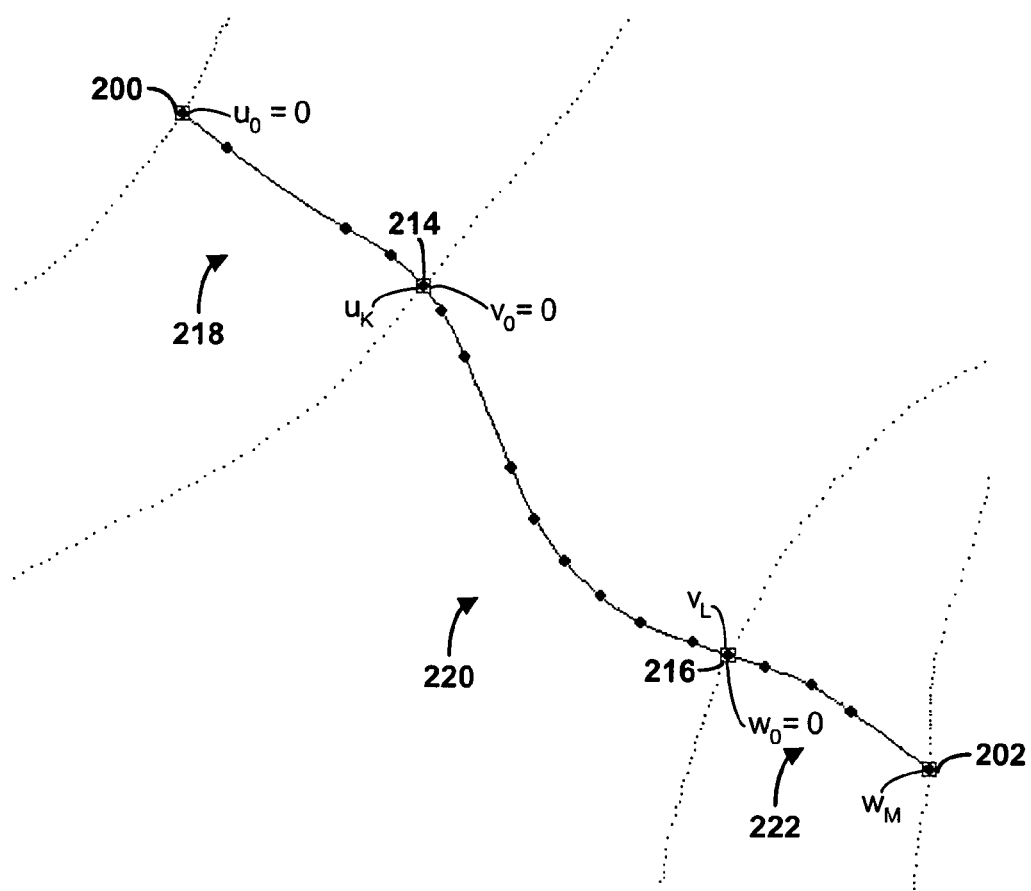
FIG. 7 illustrates one example of three new splines resulting from subdividing the original spline of FIG. 5.

After the knot insertions, the original spline 204 is divided into three individual non-uniform B-splines 218, 220, and 222. FIG. 7 shows the three new splines resulting from subdividing the original spline 204. For example, spline 218 has endpoints 200 and 214, spline 220 has endpoints 214 and 216, and spline 222 has endpoints 216 and 202. The shape of the three new splines follows the shape of the original spline 204, thus maintaining the continuity and smoothness of the original spline at the intersection points 214 and 216.

In addition, after the knot insertions, the knot values of the three subdivided sections 218, 220, and 222 of the original spline 204 can be re-parameterized into individual non-uniform B-splines. The knots need to be reparameterized so that the resulting knot vectors will form the new splines 218, 220, and 222. The knots can be reparameterized so that the knot values start at knot value 0 and end at the appropriate value. For example, as shown in FIG. 7, the knot vector of spline 218 has knot values $u_0=0$ to $u_K=t_Q$, the knot vector of spline 220 has knot values $v_0=0$ to $v_L=t_Q-t_P$, and the knot vector of spline 222 has knot values $w_0=0$ to $w_M=t_N-t_Q$.

Data representing intersection locations can be updated to the intersection database 104. An intersection location can be a point (e.g. represented by its latitude and longitude coordinate) or a parametric value or knot index associated with a spline in the spline database 102. In the exemplary embodiment, if intersection locations are determined based on splines that cross one another, the intersection database 104 can be updated with data representing such intersections. Such intersections can also be represented by inserting knots into crossing splines at the location where they intersect, and updating the spline database 102 accordingly.

In another embodiment, if intersection points are known, for example, by obtaining the intersection points from the intersection database 104, knot insertion can be completed and each newly individual created spline can then be stored into the table in the spline database 102. For example, the reparameterized knot values for splines 218, 220, and 222 along with their control points could be stored in the spline database 102.

In addition, the new individual splines can be associated with individual road segments and stored in a road database. For example, each of the splines 218, 220, and 222 represents a road segment of the main road 203. Thus, the control points and knot values for these splines could be associated with their appropriate road segment and stored in a road database containing information pertaining to the road 203. Depending on how a road database is configured, the control points and knot values for these splines can be associated with data records of appropriate road segments. In this manner, since these three splines are adjacent, when viewed together, their shape matches that of the original road spline 204.

Figure 8:
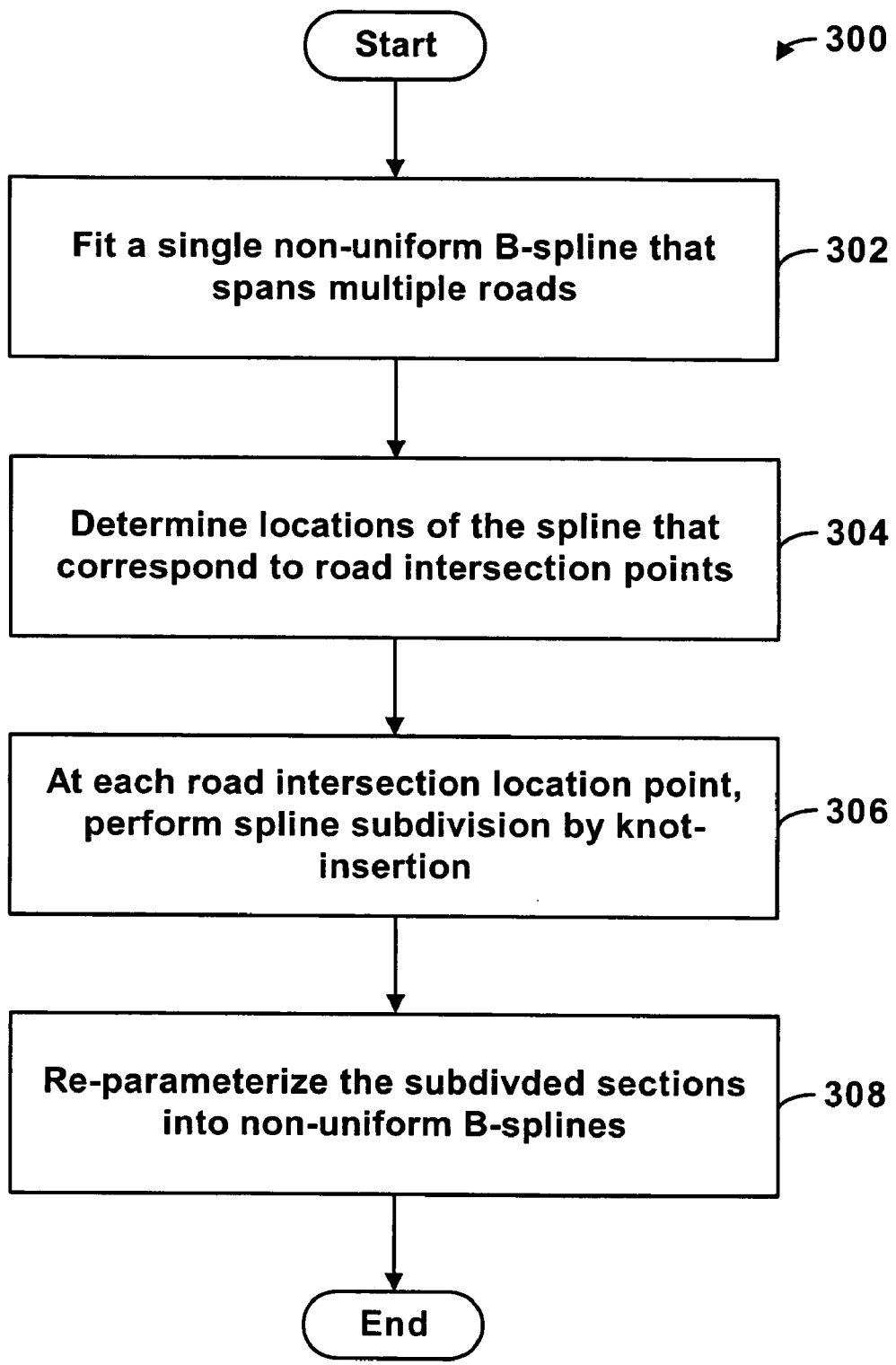
FIG. 8 depicts one embodiment of functional steps that may be performed to provide smooth geometry at road intersection points.

FIG. 8 depicts functional steps 300 that may be performed to provide smooth geometry at road intersections, as illustrated through FIGS. 5–7. As shown at block 302, initially, a single non-uniform B-spline is fit across multiple adjacent road segments. For example, as shown in FIG. 5, the spline 204 initially is created.

Next, as shown at block 304, locations of the spline that correspond to road intersection points are determined (e.g., using closest point to the curve or intersection points from a database). Next, as shown at block 306, a knot is inserted at each road intersection location point with appropriate multiplicity to subdivide the spline using known techniques for curve splitting for knot insertion. This divides the spline into individual splines. For example, after knot insertion in the above example, spline 204 is divided into splines 218, 220, and 222. Subsequently, as shown at block 308, knot values of the subdivided sections of the original spline are then re-parameterized into individual non-uniform B-splines.

The method illustrated in FIG. 8 may be performed on a road by road basis, or simultaneously for multiple splines in a road database. For example, the method may be performed individually for each road within a road database. In that manner, a single spline is created, knots can be inserted at intersection points, and the spline can then be divided into individual non-uniform B-splines based on the inserted knots. Alternatively, the method may be performed for multiple splines at once. For instance, all splines within a database could be created and temporary stored. Next, intersection points of the splines could be determined, followed by knot insertion at those points. Subsequently, each spline could then be divided into its respective individual non-uniform B-splines. Depending on the type of information available, the method of FIG. 8 may be performed accordingly.

V. Exemplary Implementation

Spline representations of geographic features according to the exemplary embodiment may be used by driver assistance systems to improve radar and vision-oriented applications. For example, this type of cartographic data can provide useful information that cannot reliably be provided by vision-oriented systems, such as speed limits, traffic and lane restrictions, or the like.

In addition, road geometry information of the exemplary embodiment can be used to determine the road ahead of the vehicle around corners or beyond obstructions. Representing road geometry using polynomial splines, as described herein, provides an accurate and compact way of representing such information in databases suitable for use in driver assistance systems.

Further, the exemplary embodiment provides smoothness in a spline representation across represented boundaries where two road segments physically meet. Solving this problem is helpful for applications that, for example, aid in lane keeping for vehicles or otherwise aid a vehicle in keeping its course. The vehicle path, therefore, needs to be smooth across intersection points of road segments to better provide a correct picture of a curvature of roads at an intersection, for example.

It is intended that the foregoing detailed description be regarded as illustrative rather than limiting, and that it is understood that the following claims including all equivalents are intended to define the scope of the invention.

We claim:

1. A computer-implemented method of representing shapes of road segments in a computer-readable medium comprising:

using a single continuous non-uniform B-spline to represent the shapes of two road segments that connect to each other at a location that corresponds to an intersection with a third road segment;

dividing the single continuous non-uniform B-spline into two separate sections by knot insertion at a position along the single continuous non-uniform B-spline that corresponds to the location of the intersection with the third road segment;

parameterizing the two separate sections of the single continuous non-uniform B-spline into two separate non-uniform B-splines; and storing data indicating the two separate non-uniform B-splines to represent the two road segments respectively.

2. A geographic database that includes representations of road segments formed using the method of claim 1.

3. A computer-readable medium having stored thereon data representations of road segments formed using the method of claim 1.

4. The method of claim 1 wherein each non-uniform B-spline is described by a set of control points and knots.

5. The method of claim 1 wherein knot spacing along each non-uniform B-spline is non-uniform.

6. The method of claim 1 wherein knot spacing along each non-uniform B-spline is uniform.

7. The method of claim 1 wherein a parametric value of the knot insertion is based, at least in part, on a closest-point of a known intersection point projected onto the single continuous non-uniform B-spline.

8. The method according to claim 1 wherein the intersection is determined, at least in part, by a crossing point between the single continuous non-uniform B-spline and another B-spline connected to the single continuous non-uniform B-spline.

9. A computer database that represents road segments located in a geographic area, wherein road segments are represented in the database by non-uniform B-splines to indicate shapes thereof;

and wherein the non-uniform B-splines used to represent the shapes of two road segments that connect to each other at a location that corresponds to an intersection with a third road segment have a property such that a single continuous non-uniform B-spline representing the shapes of the two road segments together, if divided into two separate sections by knot insertion at the position corresponding to the location of the intersection with the third road segment and parameterized, would form the two separate non-uniform B-splines.

10. A computer-readable medium having stored thereon data representations of road segments formed using the database of claim 9.

11. The database of claim 9 wherein each non-uniform B-spline is described by a set of control points and knots.

12. The database of claim 9 wherein knot spacing along each non-uniform B-spline is nonuniform.

13. The database of claim 9 wherein knot spacing along each non-uniform B-spline is uniform.

14. The database of claim 9 wherein a parametric value of the knot insertion is based, at least in part, on a closest-point of a known intersection point projected onto the single continuous non-uniform B-spline.

15. The database according to claim 9 wherein the intersection is based, at least in part, on crossing points between the single continuous non-uniform B-spline and another B-spline connected to the single continuous non-uniform B-spline.

16. A computer-implemented method of representing shapes of road segments in a computer-readable medium comprising:
- using a single continuous non-uniform B-spline to represent the shapes of multiple segments of a road that connect to each other at locations that correspond to intersections of the road with other roads;
- dividing the single continuous non-uniform B-spline into separate sections by knot insertion at positions along the single continuous non-uniform B-spline that corresponds to the locations of the intersections;
- parameterizing the separate sections of the single continuous non-uniform B-spline into separate non-uniform B-splines; and
- storing data indicating the separate non-uniform B-splines to represent each of the respective multiple segments of the road.

17. A geographic database that includes representations of road segments formed using the method of claim 16.

18. A computer-readable medium having stored thereon data representations of road segments formed using the method of claim 16.

19. The method of claim 16 wherein each non-uniform B-spline is described by a set of control points and knots.

20. The method of claim 16 wherein knot spacing along each non-uniform B-spline is non-uniform.

21. The method of claim 16 wherein knot spacing along each non-uniform B-spline is uniform.

22. The database of claim 16 wherein a parametric value of the knot insertion is based, at least in part, on a closest-point of a known intersection point projected onto the single continuous non-uniform B-spline.

23. The database according to claim 16 wherein the intersection is based, at least in part, on crossing points between the single continuous non-uniform B-spline and another B-spline connected to the single continuous non-uniform B-spline.

24. A computer-implemented method comprising:
- parameterizing a shape of a first road segment and a second road segment into a single continuous B-spline, wherein the first road segment and the second road segment are connected to a third road segment at an intersection;
- dividing the single continuous B-spline into two separate sections by knot insertion at the intersection;
- re-parameterizing the two separate sections of the single continuous B-spline into two separate B-splines representing respectively a shape of the first road segment and a shape of the second road segment; and
- storing data of the two separate B-splines to a cartographic database.

25. The method according to claim 24 wherein one of the two separate B-splines is connected to multiple road segments at multiple intersections further comprises:
- diving the one of the two separate non-uniform B-splines into another two separate sections by knot insertion at each of the other intersections;
- re-parameterizing the another two separate sections into another two separate non-uniform B-splines representing respectively a shape of two further road segments of the second road segment; and
- storing data of the another two separate non-uniform B-splines to the cartographic database.

26. The method according to claim 24 wherein storing data of the two separate B-splines to a cartographic database further comprises:
- storing at least portion of control points and knot values of the two separate B-spline to the cartographic database.

27. The method according to claim 24 wherein the single continuous B-spline is a single continuous non-uniform B-spline having non-uniform knot spacing.

28. The method according to claim 24 wherein the single continuous B-spline is a single continuous uniform B-spline having uniform knot spacing.

29. The method according to claim 24 wherein the B-splines are fitted to the road segment by applying any one or more regression approximation selected from a group of a least squares approximation, least trimmed squares approximation, and least median of squares approximation.

30. The method of claim 24 wherein the intersection is determined, at least in part, from a geographic database.

31. The method of claim 24 wherein a parametric value of the knot insertion is based, at least in part, on a closest-point of a known intersection point projected onto the single continuous B-spline.

32. The method according to claim 24 wherein the intersection is determined, at least in part, by a crossing point between the single continuous B-spline and another B-spline connected to the single continuous B-spline.

33. A geographic database that includes representations of road segments formed using the method of claim 24.

34. A computer-readable medium having stored thereon data representations of road segments formed using the method of claim 24.

* * * * *